(12) United States Patent
Fan

(10) Patent No.: US 8,810,736 B1
(45) Date of Patent: *Aug. 19, 2014

(54) METHOD OF CONTROLLING COMPUTER USING DISPLAY SCREEN

(76) Inventor: Nongqiang Fan, Holbrook, NY (US)

( * ) Notice: Subject to any disclaimer, the term of this patent is extended or adjusted under 35 U.S.C. 154(b) by 629 days.

This patent is subject to a terminal disclaimer.

(21) Appl. No.: 13/189,546

(22) Filed: Jul. 24, 2011

(51) Int. Cl.
*H04N 5/44* (2011.01)

(52) U.S. Cl.
USPC .......................................... 348/734; 348/801

(58) Field of Classification Search
CPC .......... H04N 13/0404; H04N 21/4122; H04N 21/4113; H04N 21/4126; H04N 21/42204; H04N 21/42222; H04N 5/4403
USPC ................. 348/734, 725, 723, 552, 553, 801; 345/157–158; 340/825.69, 825.72, 340/825.22
IPC ......................................................... H04N 5/44
See application file for complete search history.

(56) References Cited

U.S. PATENT DOCUMENTS

| 5,926,168 A * | 7/1999 | Fan ................................ 345/158 |
| 6,727,887 B1 * | 4/2004 | Levine et al. ................. 345/158 |
| 7,053,965 B1 * | 5/2006 | Fan ................................ 348/734 |
| 8,531,613 B1 * | 9/2013 | Fan ................................ 348/734 |

\* cited by examiner

*Primary Examiner* — Trang U Tran

(57) ABSTRACT

A display device includes a matrix of pixel elements and a matrix of photo-detecting elements. The display device also includes an interface port accessible from the outside of the display device and configured to output a representation of a position of an invisible light spot on the display screen generated from an invisible light beam projected thereon with a spreading angle less than 20 degrees. The position of the invisible light spot is determined based on measurement from the photodetectors in the matrix of photo-detecting elements.

25 Claims, 10 Drawing Sheets

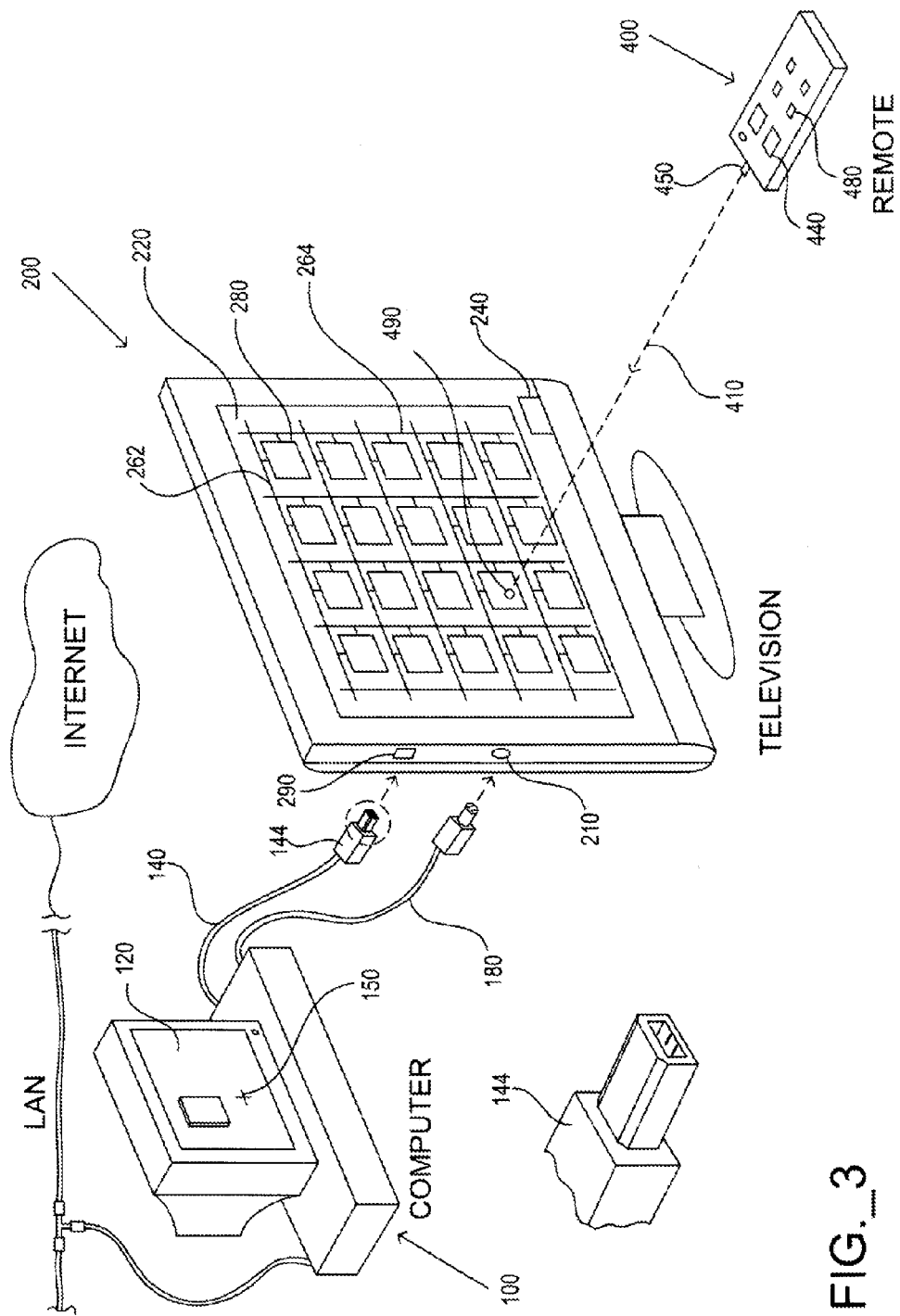
FIG._3

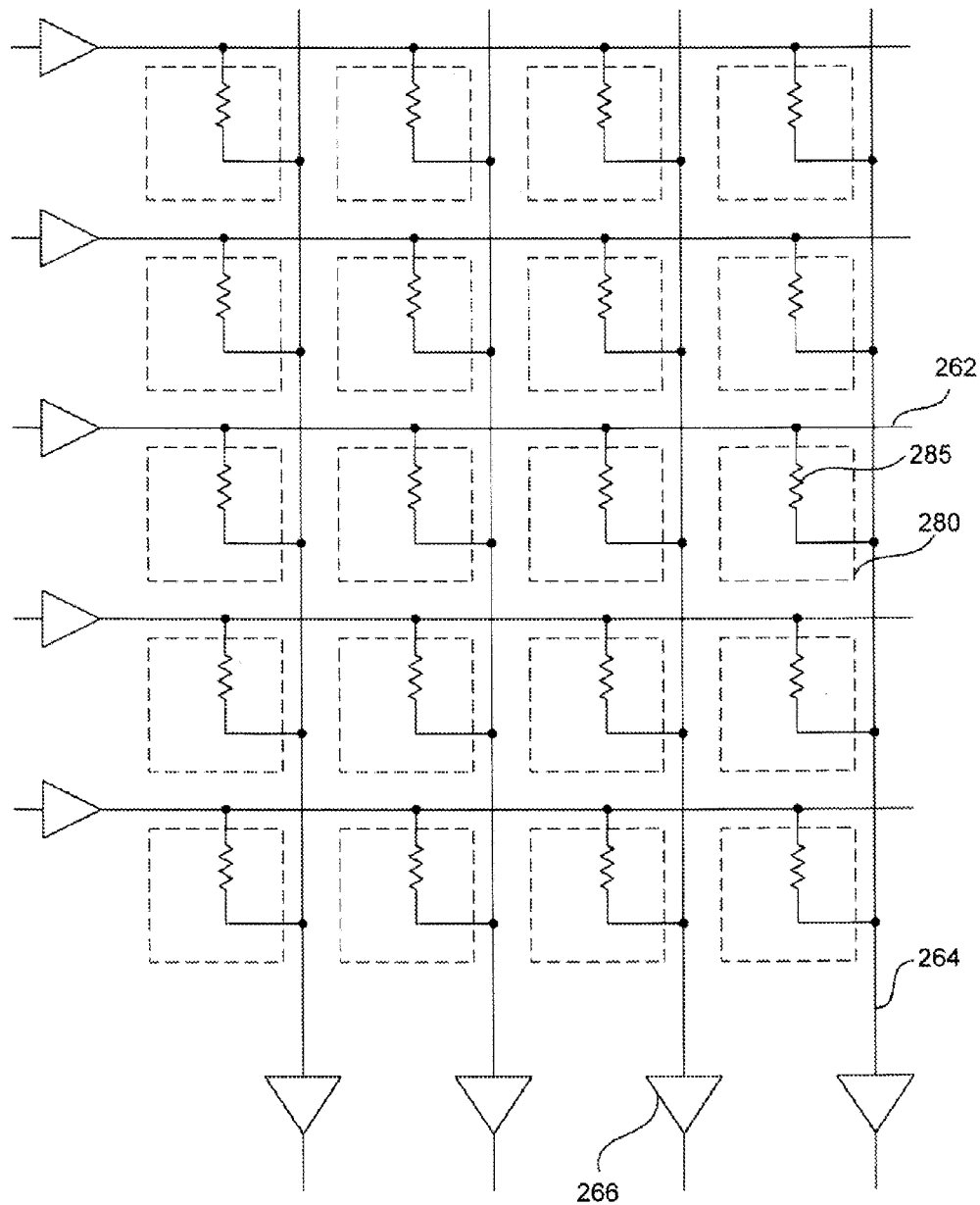
FIG._5B

FIG._7

METHOD OF CONTROLLING COMPUTER USING DISPLAY SCREEN

RELATED APPLICATIONS

This application is related to application Ser. No. 11/463,892, which is issued as U.S. Pat. No. 8,531,613.

BACKGROUND

The present invention relates generally to methods of controlling computers using television screens.

Many users watch videos with a computer connected to the Internet. A user can watch video clips or television programs streamed or downloaded into the computer from a video-on-demand server on the Internet. Because the computer screen generally is too small, many people would like to connected the computer with a television and watch those video clips or television programs on a bigger television screen.

FIG. 1 shows that a computer 100 connected to the Internet is controlled by a mouse 160 and transmits an image to a television screen 220. The mouse 160 is connected to the computer 100 through a cable 140. The mouse 160 can control the position of a cursor 150 on a computer screen 120. The computer 100 is connected to the television 200 through a video cable 180. When the position of a cursor 150 on a computer screen 120 changes, the position of a cursor 250 on a television screen 220 changes accordingly.

With the computer and television system as shown in FIG. 1, while a user can watch those video clips or television programs on a big television screen, the user may still need to control the playing mode of the video clips or television programs with the mouse 160 for the computer. The user may like to control the playing mode of the video clips or television programs with a television remote control. More generally, the user may like to control the position of the cursor of the television screen so that the user can also control the download and streaming process of the video clips or television programs. It is desirable to control computers with a television system including a remote control that can directly place a cursor on a television screen at a position as pointed by the user.

SUMMARY

In one aspect, a method can be used for controlling a computer using a screen of a television. The method includes the following steps: (1) measuring with a matrix of photo-detecting elements on the television screen a position of an invisible light spot on a television screen projected thereon from an invisible light beam generated by a light source on a television remote control; and (2) transmitting from the television to a computer a representation of the position of the invisible light spot on the television screen.

In one implementation, the method can include displaying on the television screen an image received from the computer such that a cursor is displayed on the television screen at a position substantially close to the position of the invisible light spot. The displaying can include connecting a video output port of the computer to a video input port of the television. In one implementation, the method can include displaying on the television screen an image received wirelessly from the computer such that a cursor is displayed on the television screen at a position substantially close to the position of the invisible light spot.

In one implementation, the method can include transmitting from an interface port of the television to the computer a representation of the position of the invisible light spot on the television screen. The interface port can be a USB port, a serial port, a wireless port, a Wi-Fi port or a Bluetooth port. The transmitting can include connecting the interface port of the television to a serial port, a USB port, or a PS2 serial port of the computer. In one implementation, the method can include transmitting wirelessly from the television to the computer a representation of the position of the invisible light spot on the television screen.

In one implementation, the method can include transmitting from the television to the computer through an Ethernet a representation of the position of the invisible light spot on the television screen. The method can also include displaying on the television screen an image received from the computer through the Ethernet such that a cursor is displayed on the television screen at a position substantially close to the position of the invisible light spot.

In another aspect, a television system includes a television remote control and a television having a television screen and an interface port. The television remote control includes an invisible light source fixed thereon and a selection button. The television includes a television screen. The interface port can be used to output a representation of a position of an invisible light spot on the television screen. The invisible light spot is projected onto the television screen from an invisible light beam generated from the invisible light source on the television remote control In some implementations, the interface port of the television can be a USB port, a PS2 serial port, a wireless port, a Wi-Fi port, or a Bluetooth port. In some implementations, the television can include a receiver that can receive from the television remote control a signal coded with an action of the selection button. The interface port of the television can output a representation of the action of the selection button. The action of the selection button can be an action of pressing the selection button or an action of releasing the selection button. In some implementations, the television remote control can include a first selection button representing a left mouse button and a second selection button representing a right mouse button.

In one implementation, the television can include a plurality of photodetectors and electronic circuitry configured to measure the position of the invisible light spot on the television screen using the plurality of photodetectors. In one implementation, the television can include a matrix of photo-detecting elements. A photo-detecting element can include a photodetector. The television can also include electronic circuitry configured to measure the position of the invisible light spot on the television screen using photodetectors in the matrix of photo-detecting elements.

In another aspect, a method is applied on a television having a television screen. The method includes the following steps: (1) measuring a position of an invisible light spot on the television screen that is generated from an invisible light beam projected onto the television screen; and (2) outputting a representation of the position of the invisible light spot. The measuring a position of an invisible light spot can include measuring electrical signals from multiple photo-detecting elements in a matrix of photo-detecting elements on the television screen.

In one implementation, the outputting can include outputting to a computer a representation of the position of the invisible light spot on the television screen of the television. In one implementation, the method can also include transmitting an image from the computer to the television such that a cursor is displayed on the television screen of the television at a position substantially close to the position of the invisible light spot.

In one implementation, the method can include the following steps: (1) outputting to a computer through an Ethernet a representation of the position of the invisible light spot on the television screen of the television; and (2) transmitting an image from the computer to the television through the Ethernet such that a cursor is displayed on the television screen of the television at a position substantially close to the position of the invisible light spot.

In one implementation, the television can include a first array of conducting lines, a second array of conducting lines crossing the first array of conducting lines, and a matrix of photo-detecting elements in which a photo-detecting element is electrically connected between a conducting line in the first array of conducting lines and a conducting line in the second array of conducting lines. The method can include the following steps (1) applying a selection voltage consecutively to each conducting line in the first array of conducting lines; and (2) measuring electrical signals simultaneously on multiple conducting lines in the second array of conducting lines.

In another aspect, a television system includes following elements: (1) a television screen; (2) a matrix of photo-detecting elements in which a photo-detecting element comprises a photodetector; (3) electronic circuitry configured to measure a position of an invisible light spot on the television screen generated from an invisible light beam projected thereon using photodetectors in the matrix of photo-detecting elements; (4) a receiver operable to receive from a television remote control a signal coded with an action of a button on the television remote control; and (5) electronic circuitry including an interface port and configured to output a representation of the position of the invisible light spot on the television screen and a representation of the action of the button on the television remote control.

In some implementations, the interface port can be a USB port, a PS2 serial port, a wireless port, a Wi-Fi port, or a Bluetooth port. In some implementations, the television can include a matrix of pixel elements in which a pixel element can be a liquid crystal cell, a light emitting diode, a cold cathode, or a plasma display cell.

In some implementations, the television can include a first array of conducting lines, a second array of conducting lines crossing the first array of conducting lines, and a matrix of photo-detecting elements. A photo-detecting element is electrically connected between a conducting line in the first array of conducting lines and a conducting line in the second array of conducting lines. In one implementation, a photodetector includes a first terminal electrically connected to a conducting line in the first array of conducting lines and a second terminal electrically connected to a conducting line in the second array of conducting lines. In one implementation, a photo-detecting element includes a switching transistor and a photodetector. The switching transistor includes a gate electrically connected to a conducting line in the first array of conducting lines. The photodetector includes a first terminal electrically connected to a conducting line in the second array of conducting lines though a semiconductor channel of the switching transistor. In one implementation, the photodetector has a second terminal electrically connected to a reference voltage. In one implementation, a photo-detecting element includes a capacitive element electrically connected with a photodetector in parallel. In some implementations, the television can also include a matrix of pixel elements in which a pixel element having a terminal electrically connected to a conducting line in the first array of conducting lines.

In some implementations, the television can include a matrix of pixel elements and a matrix of photo-detecting elements. The matrix of pixel elements and a matrix of photo-detecting elements can be constructed on the same substrate or on different substrates.

In another aspect, a display device comprising a matrix of pixel elements, a display screen, a first array of conducting lines, a second array of conducting lines crossing the first array of conducting lines, a matrix of photo-detecting elements, and an interface port accessible from the outside of the display device. The matrix of photo-detecting elements is constructed on a first substrate wherein a photo-detecting element is electrically connected between a first conducting line in the first array of conducting lines and a second conducting line in the second array of conducting lines. The interface port is configured to output a representation of a position of an invisible light spot on the display screen generated from an invisible light beam projected thereon with a spreading angle less than 20 degrees. The position of the invisible light spot is determined based on measurement from the photodetectors in the matrix of photo-detecting elements.

Implementations of the inventions can include one or more of the following advantages. A user may directly place a cursor on a television screen at a position as pointed by the user and use the television screen to control computers. Additional advantages of the invention will be set forth in the description which follows, and in part will be obvious from the description, or may be learned by practice of the invention. The advantages of the invention may be realized by means of the instrumentalities and combinations particularly pointed out in the claims.

BRIEF DESCRIPTION OF THE DRAWINGS

The present invention will be understood more fully from the detailed description and accompanying drawings of the invention set forth herein. However, the drawings are not to be construed as limiting the invention to the specific embodiments shown and described herein. Like reference numbers are designated in the various drawings to indicate like elements.

FIG. 3 shows an implementation of the television that includes a matrix of photo-detecting elements for detecting the position of the infrared laser spot on the television screen.

FIG. 5A and FIG. 5B show that a photo-detecting element can include a photodetector.

DETAILED DESCRIPTION

Figure 1:
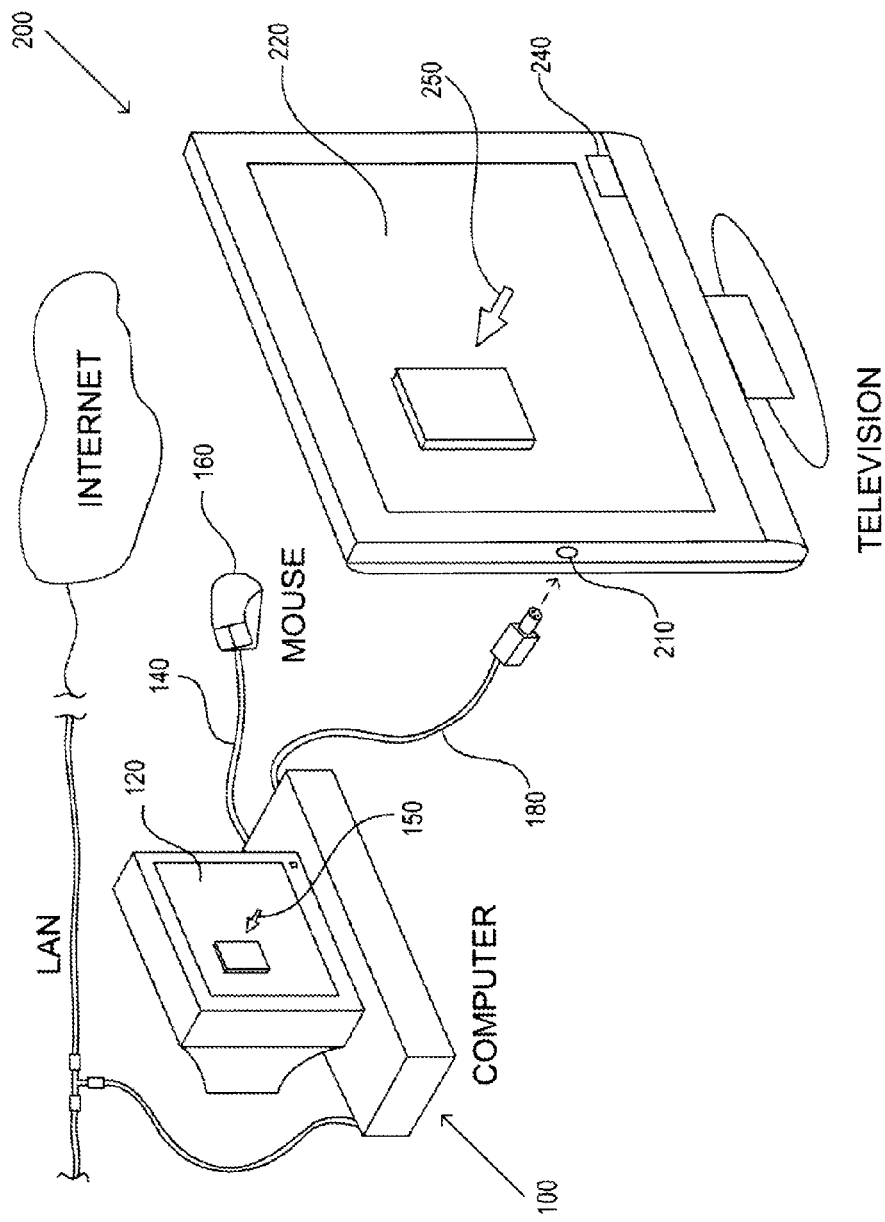
FIG. 1 shows that a computer connected to the Internet is controlled by a mouse and transmits an image to a television screen.
Figure 2:
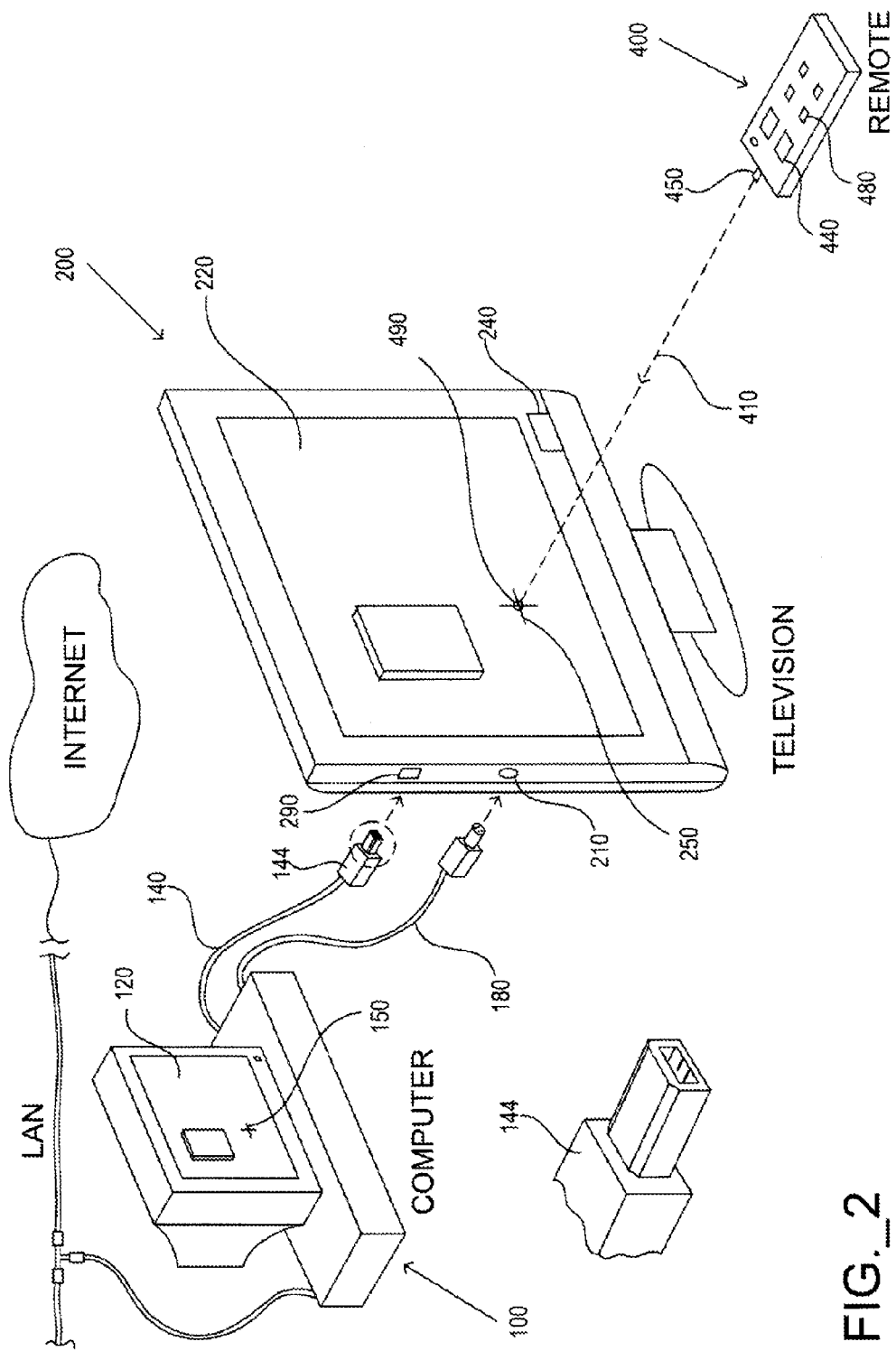
FIG. 2 shows one implementation of a television system that includes a television remote control that can directly place a cursor on a television screen at a position as pointed by the television remote control.

FIG. 2 shows one implementation of a television system that includes a television remote control 400 that can directly place a cursor 250 on a television screen 220 at a position 490 as pointed by the television remote control. The television remote control 400 includes an infrared laser device 450, at least one conventional button 480, and at least one selection button 440. A conventional button 480 can be a channel up button, channel down button, volume up button, volume down button, or some other commonly used television control button. In certain operational mode, the selection button 440 can be used to mimic a mouse button (such as a left mouse button or a right mouse button) when the television 200 is connected to a computer 100. The infrared laser device 450 can generate an infrared laser beam 410. When this infrared laser beam 410 is projected upon the television screen 220, an infrared laser spot 490 can be generated at the position as pointed by the television remote control 400. The television 200 includes an interface port 290 that can be used to output a representation of the position of the infrared laser spot 490 on the television screen 220. The television 200 also includes receiver 240. In one implementation, the receiver 240 can be used to receive coded infrared signals from the television remote control 400. In another implementation, the receiver 240 can be used to receive signals that are coded with an action of the selection button 440 on the television remote control 400. The receiver 240 can be configured to receive infrared, RF, or other electromagnetic signals.

In one implementation as shown in FIG. 2, the computer 100 is connected to the television 200 through a video cable 180 to output an image on the television screen 220; the interface port 290 is connected to the computer 100 to transmit to the computer 100 a representation of the position of the infrared laser spot 490 on the television screen 220. With such an implementation of the computer and television system, both the cursor 150 on the computer screen 120 and the cursor 250 on the television screen 220 can be easily controlled with the television remote control 400. Consequently, with a properly designed Graphic User Interface, the computer 100 can be controlled with the television remote control 400.

In another implementation, the computer 100 can be a television set-top box, or other kinds of specially designed computer. With a properly designed Graphic User Interface, the computer 100 can be controlled with the television remote control 400 even no computer screen 120 is used for the computer 100 or no computer screen 120 is connected to the computer 100.

FIG. 3 shows an implementation of the television 200 that includes a matrix of photo-detecting elements 280 for detecting the position of the infrared laser spot 490 on the television screen 220. In one implementation, the television 200 can also include a first array of conducting lines 262 and a second array of conducting lines 264. The second array of conducting lines 264 crosses the first array of conducting lines 262. A photo-detecting element 280 is electrically connected between a conducting line 262 in the first array of conducting lines and a conducting line 264 in the second array of conducting lines.

Figure 4A:
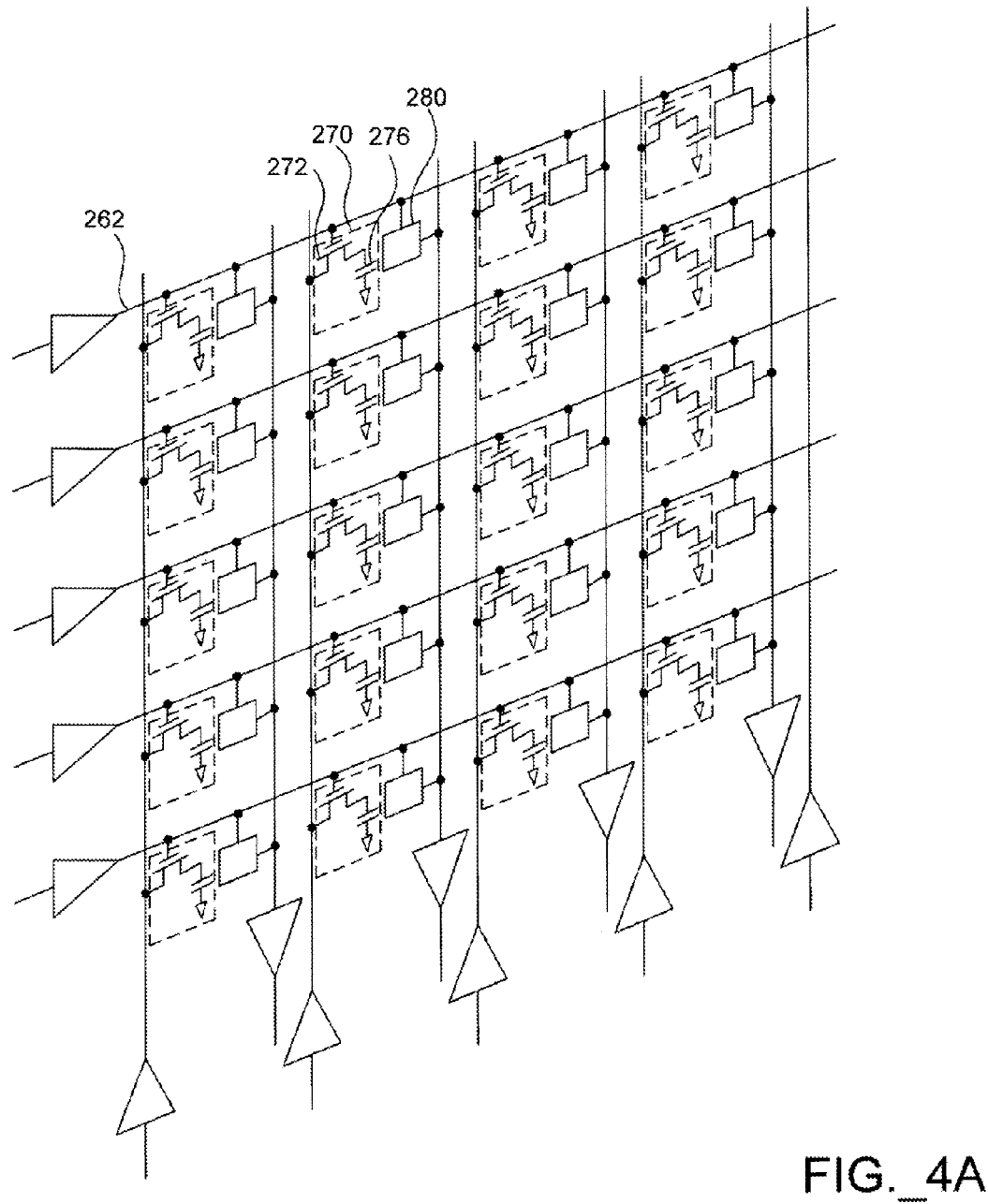
FIG. 4A and FIG. 4B show that the television can include a matrix of pixel elements.
Figure 4B:
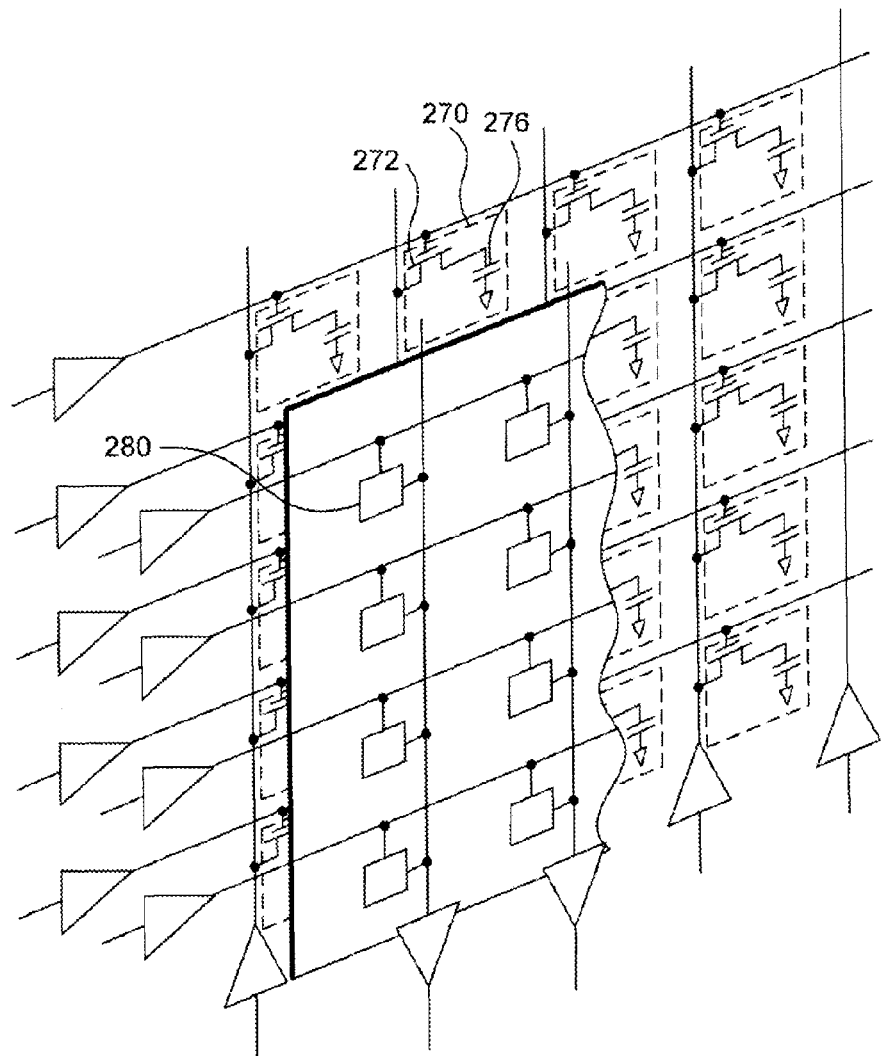

FIG. 4A and FIG. 4B show that the television 200 can also include a matrix of pixel elements 270. In the implementations as shown in FIG. 4A and FIG. 4B, when the television 200 is based on a liquid crystal display, a pixel element 270 can be a liquid crystal cell. In other implementations, when the television 200 is based on a solid light emitting display (e.g., OLED), a pixel element 270 can include a light emitting diode. In still other implementations, when the television 200 is based on a filed emission display (e.g., a Surface conduction Emission Display or a Nano Emission Display), a pixel element 270 can include a cold cathode. In still other implementations, when the television 200 is based on a plasma display, a pixel element 270 can include a plasma display cell.

In FIG. 4A, the matrix of photo-detecting elements 280 and the matrix of pixel elements 270 (e.g., a pixel element having a liquid crystal cell or a pixel element having a light emitting diode) are constructed on the same substrate. In FIG. 4B, the matrix of photo-detecting elements 280 and the matrix of pixel elements 270 are constructed on different substrates. In one implementation, when the television 200 is based on a filed emission display or a plasma display, the matrix of photo-detecting elements 280 can be constructed on the faceplate of the field emission display or the plasma display.

Figure 5A:
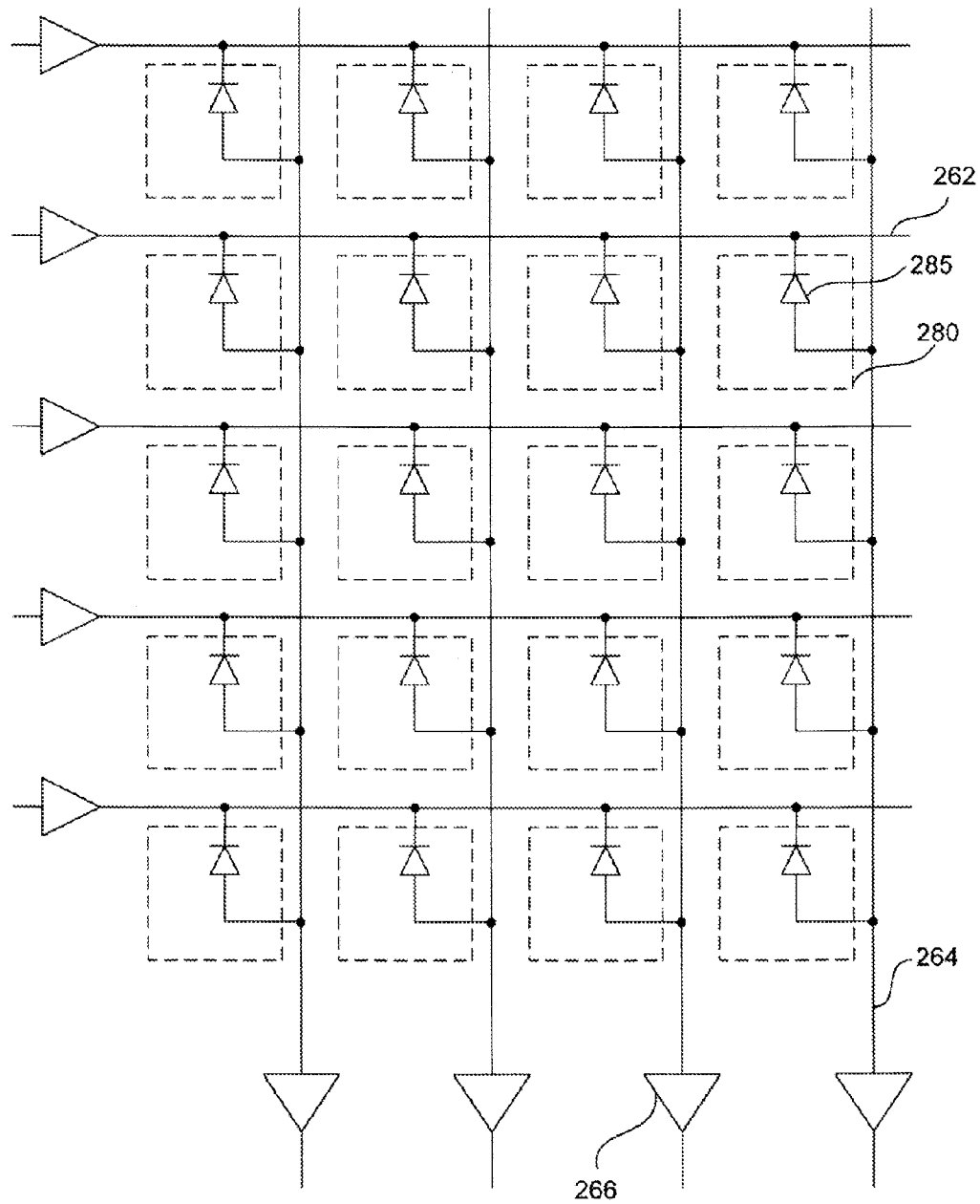

FIG. 5A and FIG. 5B show that a photo-detecting element 280 can include a photodetector 285. In one implementation, as shown in FIG. 5A, a photodetector 285 can be a photodiode. In another implementation, as shown in FIG. 5B, a photodetector 285 can also be a segment of photoconductor. In other implementations, a photodetector 285 can be a phototransistor. In one implementation, a selection voltage consecutively applied to each conducting line 262 in the first array of conducting lines to select a row of photo-detecting elements, and the current or voltage changes in each selected photo-detecting element can be read with measuring circuit 266.

Figure 6:
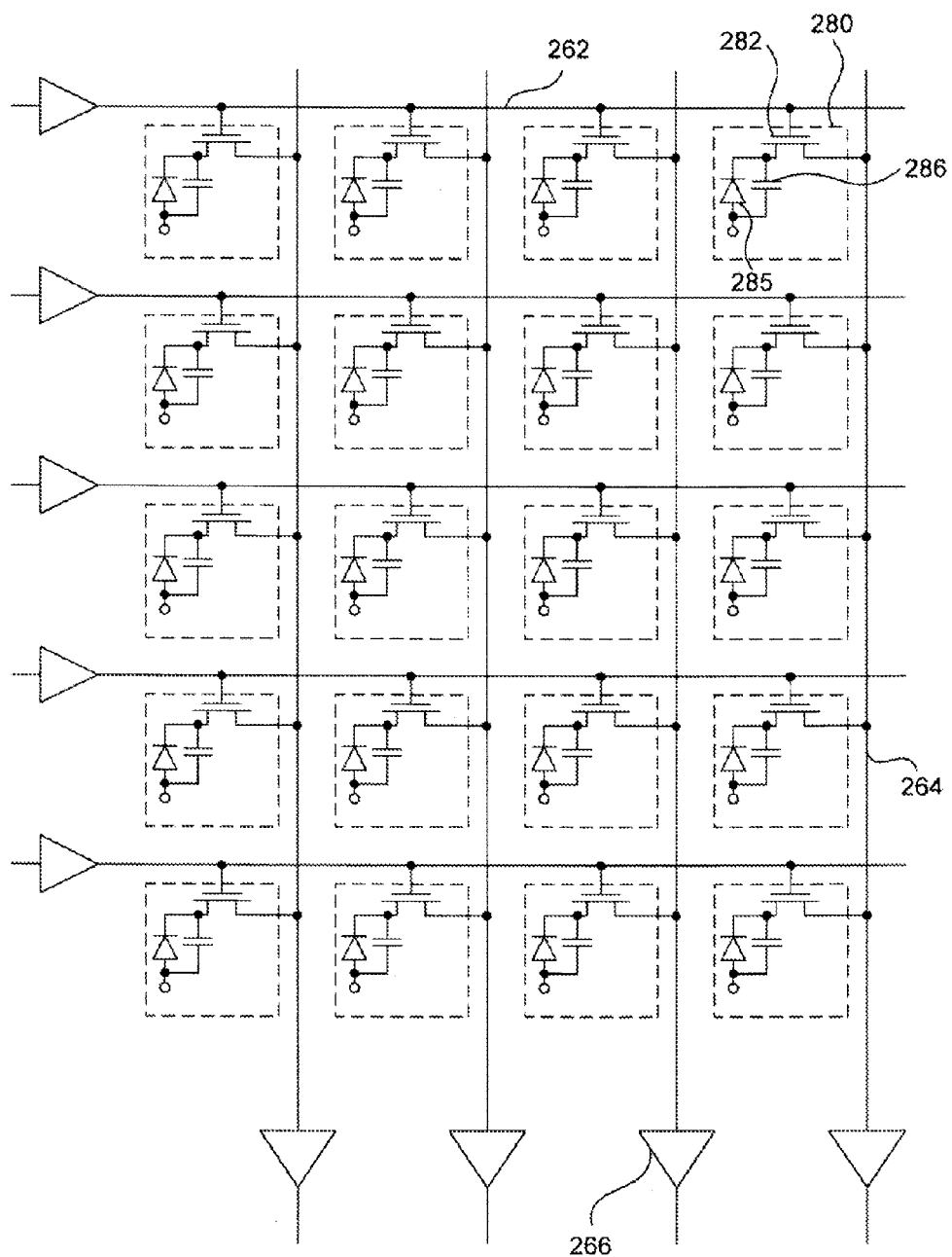
FIG. 6 shows that a photo-detecting element can include a switching transistor having a gate electrically connected to a conducting line in the first array of conducting lines.

FIG. 6 shows that a photo-detecting element 280 can include a switching transistor 282 having a gate electrically connected to a conducting line 262 in the first array of conducting lines. In FIG. 6, the photodetector 285 has a first terminal electrically connected to a conducting line 264 in the second array of conducting lines though a semiconductor channel of the switching transistor 282. In addition, the photo-detecting element 280 can include a capacitive element 286. In operation, when the capacitive element 286 is charged to a predetermined voltage, a voltage discharge through the photodetector 285 is related to the amount of the light received by the photodetector 285. The amount of voltage discharge on the capacitive element 286 in each photo-detecting element 280 can be read out line by line in this active matrix circuit. In one implementation, a selection voltage consecutively applied to each conducting line 262 in the first array of conducting lines to select a row of photo-detecting elements, and voltages on the capacitive element 286 in each selected photo-detecting element can be read with measuring circuit 266.

As shown in FIG. 4A, when the television 200 is based on an active matrix display, a pixel element 270 includes a switching transistor 272 and a capacitive element 276. Both the gate of the switching transistor 272 in the pixel element 270 and the gate of the switching transistor 282 in the photo-detecting element 280 can be connected to a conducting line 262 in the first array of conducting lines.

Figure 7:
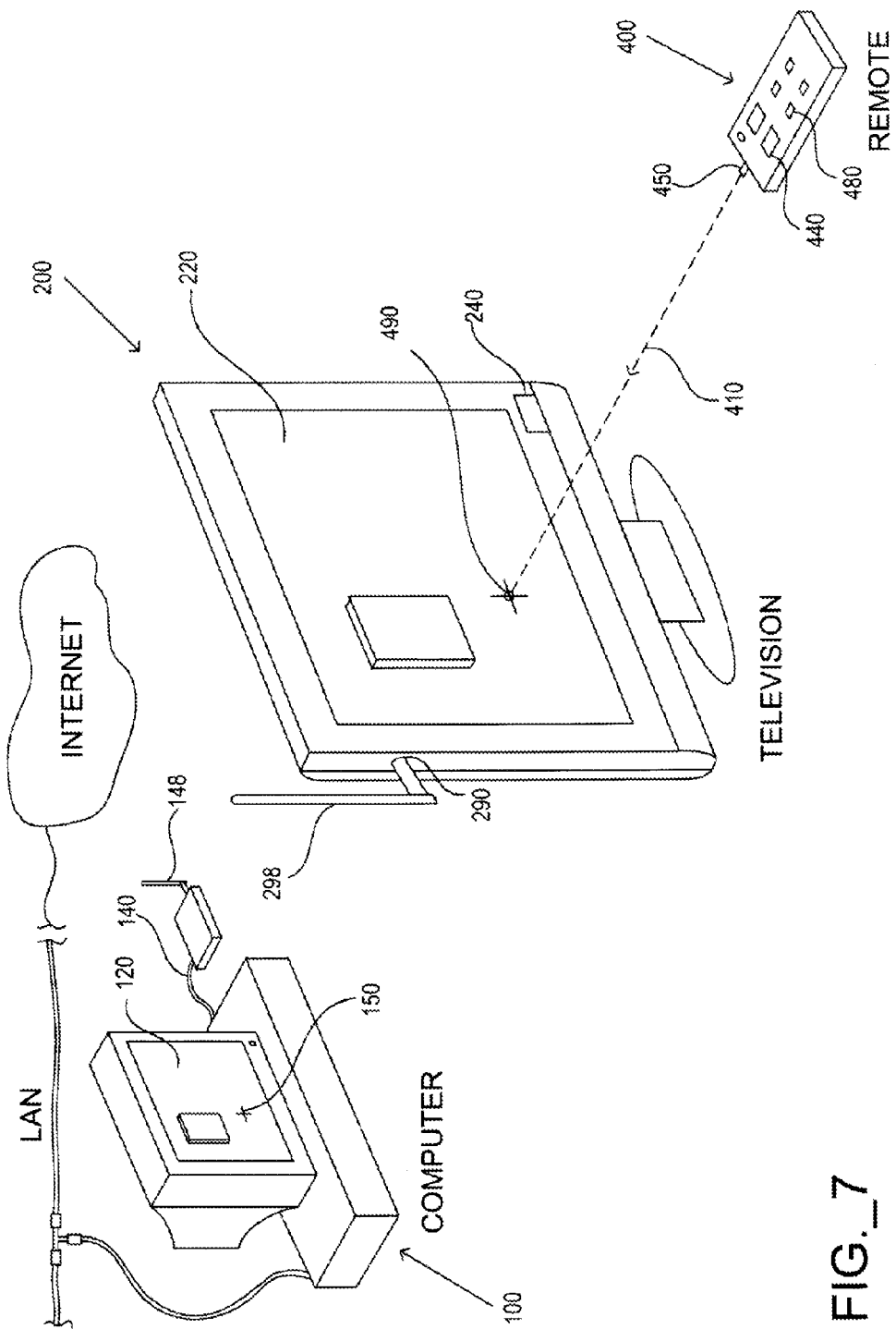
FIG. 7 shows the television can transmit wirelessly to the computer a representation of the position of the infrared laser spot on the television screen.

In FIG. 2, the interface port 290 of the television 200 is connected to the computer 100 through a cable 140 to transmit to the computer a representation of the position of the infrared laser spot 490 on the television screen 220. FIG. 7 shows that the television 200 can transmit wirelessly to the computer 100 a representation of the position of the infrared laser spot 490 on the television screen 220. The television 200 can have an antenna 298 for transmitting signals wirelessly to an antenna 148 connected to the computer 100.

In FIG. 2, the computer 100 can transmit an image to the television 200 through a video cable 180. In other implementations, the computer 100 can transmit an image to the television 200 through an Ethernet cable. The television 200 can also transmit to the computer 100 through the same Ethernet cable a representation of the position of the infrared laser spot 490 on the television screen 220.

Figure 8:
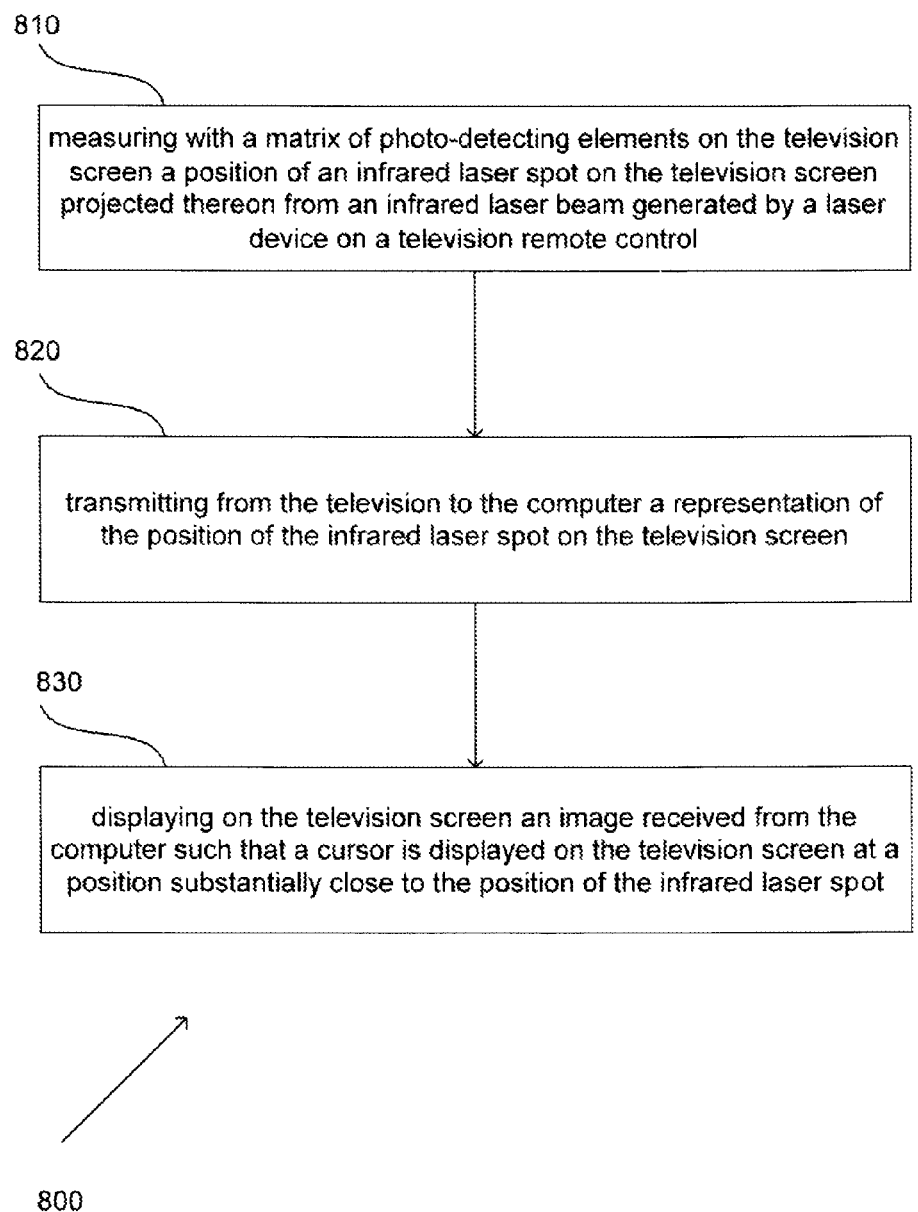
FIG. 8 shows that a method of controlling the computer using the television screen.

FIG. 8 shows a method 800 of controlling the computer 100 using the television screen 220. The method 800 includes steps 810, 820, and 830.

The step 810 includes measuring with a matrix of photo-detecting elements on the television screen a position of an infrared laser spot on the television screen projected thereon from an infrared laser beam generated by a laser device on a television remote control. In one implementation as shown in FIG. 3, the infrared laser beam 410 is generated by the infrared laser device 450 on the television remote control 400. The infrared laser beam 410 is projected onto the television screen 220 and creates the infrared laser spot 490. The position of the infrared laser spot 490 is measured with a matrix of photo-detecting elements 280 on the television screen 220.

The step 820 includes transmitting from the television to the computer a representation of the position of the infrared laser spot on the television screen. In one implementation as shown in FIG. 2, the position of the infrared laser spot 490 on the television screen 220 is transmitted from the television 200 to the computer 100 through a cable. In another implementation as shown in FIG. 7, the position of the infrared laser spot 490 on the television screen 220 is transmitted wirelessly from the television 200 to the computer 100.

The step 830 includes displaying on the television screen an image received from the computer such that a cursor is displayed on the television screen at a position substantially close to the position of the infrared laser spot. In one implementation as shown in FIG. 2, the television 200 receives an image from the computer 100 through the video cable 180 and displays a cursor 250 on the television screen 220 at a position substantially close to the position of the infrared laser spot 490. In another implementation as shown in FIG. 7, the television 200 receives an image from the computer 100 wirelessly and displays a cursor 250 on the television screen 220 at a position substantially close to the position of the infrared laser spot 490. In still other implementations, the position of the infrared laser spot 490 on the television screen 220 is transmitted from the television 200 to the computer 100 through an Ethernet cable; the television 200 receives an image from the computer 100 through the same Ethernet cable and displays a cursor 250 on the television screen 220 at a position substantially close to the position of the infrared laser spot 490.

Generally, in some implementations, the infrared laser device 450 can be replaced with an ultraviolet laser device, the infrared laser beam 410 can be an ultraviolet laser beam, and the infrared laser spot 490 can be an ultraviolet laser spot. In some implementations, the infrared laser device 450 can be replaced by other kinds of light sources (such as, an infrared LED or ultraviolet LED) positioned behind a narrow optical beam projection system (such as, some specially designed lens system). That is, the infrared laser beam 410 can be replaced with other kinds of invisible light beam, and the infrared laser spot 490 replaced with other kinds of invisible light spot. The invisible light beam preferably has a spreading angle less than 10 or 20 degrees, with the corresponding solid angle less than $\pi (5\pi/180)^2$ or $\pi (10\pi/180)^2$.

In general, the interface port 290 of the television 200 can be a USB port, a PS2 serial port, a wireless port, a Wi-Fi port, or a Bluetooth port. A pixel element 270 in the matrix of pixel elements can be a liquid crystal cell, a light emitting diode, a cold cathode, or a plasma display cell. A photodetector 285 can be a photodiode, a phototransistor, a segment of photoconductor, or a segment of semiconductor. Examples of the computer 100 includes desktop computers, notebook computers, mobile computers (e.g., smart phones), tablet computers, home entrainment set-top boxes, game console boxes, or any other kinds of general purpose or special purpose computers. For certain applications, the television 200 can be simply replaced with a display device that includes a matrix of pixel elements 270 and a matrix of photo-detecting elements 280 as shown in FIGS. 4A-FIG. 4B, and such display device does not have to include traditional television functions.

The present invention has been described in terms of a number of implementations. The invention, however, is not limited to the implementations depicted and described. Rather, the scope of the invention is defined by the appended claims. Any element in a claim that does not explicitly state "means for" performing a specific function, or "step for" performing a specific function, is not to be interpreted as a "means" or "step" clause as specified in 35 U.S.C. §112, ¶6.

What is claimed is:

1. A method comprising:
   measuring with a two-dimensional matrix of photo-detecting elements constructed on a substrate having thereon a matrix of pixel elements of a television screen a position of an invisible light spot on the television screen projected thereon from an invisible light beam with a spreading angle less than 20 degrees generated by a light source on a television remote control, the two-dimensional matrix of photo-detecting elements being arranged in a plurality of rows and a plurality of columns; and
   transmitting from the television to a computer a representation of the position of the invisible light spot on the television screen through an interface port accessible from the outside of the television.

2. The method of claim 1, further comprising:
   displaying on the television screen an image received from the computer such that a cursor is displayed on the television screen at a position substantially close to the position of the invisible light spot.

3. The method of claim 1, further comprising:
   displaying on the television screen an image received wirelessly from the computer such that a cursor is displayed on the television screen at a position substantially close to the position of the invisible light spot.

4. The method of claim 1, wherein the transmitting comprises:
   transmitting from an interface port of the television to the computer through a cable a representation of the position of the invisible light spot on the television screen.

5. The method of claim 1, wherein the transmitting comprises:
   transmitting wirelessly from the television to the computer a representation of the position of the invisible light spot on the television screen.

6. The method of claim 1, comprises:
   transmitting from the television to the computer through an Ethernet a representation of the position of the invisible light spot on the television screen; and
   displaying on the television screen an image received from the computer through the Ethernet such that a cursor is displayed on the television screen at a position substantially close to the position of the invisible light spot.

7. A television system comprising:
   a television remote control comprising an invisible light source fixed thereon and a selection button; and
   a television comprising a television screen and an interface port operable to output a representation of a position of an invisible light spot on the television screen projected thereon from an invisible light beam with a spreading angle less than 20 degrees generated from the invisible light source on the television remote control and;

a matrix of photo-detecting elements constructed on a substrate having thereon a matrix of pixel elements of the television screen, wherein a photo-detecting element comprises a photodetector; and electronic circuitry configured to measure the position of the invisible light spot on the television screen using photodetectors in the matrix of photo-detecting elements.

8. The television system of claim 7, wherein the interface port of the television includes any one of a USB port, a PS2 serial port, a wireless port, a Wi-Fi port, and a Bluetooth port.

9. The television system of claim 7, wherein the television comprises:

a receiver operable to receive from the television remote control a signal coded with an action of the selection button; and wherein the interface port is operable to output a representation of the action of the selection button.

10. A method applied on a television having a television screen, the method comprising:

measuring a position of an invisible light spot on the television screen that is generated from an invisible light beam with a spreading angle less than 20 degrees projected onto the television screen;

outputting a representation of the position of the invisible light spot through an interface port accessible from the outside of the television; and wherein the measuring a position of an invisible light spot comprises measuring electrical signals from multiple photo-detecting elements in a two-dimensional matrix of photo-detecting elements constructed on a substrate having thereon a matrix of pixel elements of the television screen, the two-dimensional matrix of photo-detecting elements being arranged in a plurality of rows and a plurality of columns.

11. The method of claim 10, wherein the outputting comprises:

outputting to a computer a representation of the position of the invisible light spot on the television screen of the television.

12. The method of claim 10, further comprising:

outputting to a computer a representation of the position of the invisible light spot on the television screen of the television; and transmitting an image from the computer to the television such that a cursor is displayed on the television screen of the television at a position substantially close to the position of the invisible light spot.

13. The method of claim 10, further comprising:

outputting to a computer through an Ethernet a representation of the position of the invisible light spot on the television screen of the television; and transmitting an image from the computer to the television through the Ethernet such that a cursor is displayed on the television screen of the television at a position substantially close to the position of the invisible light spot.

14. The method of claim 10, wherein the television comprises:

a first array of conducting lines;

a second array of conducting lines crossing the first array of conducting lines; and a matrix of photo-detecting elements wherein a photo-detecting element is electrically connected between a conducting line in the first array of conducting lines and a conducting line in the second array of conducting lines.

15. The method of claim 14, further comprising:

applying a selection voltage consecutively to each conducting line in the first array of conducting lines; and measuring electrical signals simultaneously on multiple conducting lines in the second array of conducting lines.

16. A television comprising:

a television screen;

a matrix of photo-detecting elements wherein a photo-detecting element comprises a photodetector;

electronic circuitry configured to measure a position of an invisible light spot on the television screen generated from an invisible light beam projected thereon using photodetectors in the matrix of photo-detecting elements constructed on a substrate having thereon a matrix of pixel elements of the television screen;

a receiver operable to receive from a television remote control a signal coded with an action of a button on the television remote control; and electronic circuitry including an interface port and configured to output a representation of the position of the invisible light spot on the television screen and a representation of the action of the button on the television remote control.

17. The television of claim 16, wherein the interface port includes any one of a USB port, a PS2 serial port, a wireless port, a Wi-Fi port, and a Bluetooth port.

18. The television of claim 16, further comprising:

a matrix of pixel elements wherein a pixel element includes any one of a liquid crystal cell, a light emitting diode, a cold cathode, and a plasma display cell.

19. The television of claim 16, further comprising:

a first array of conducting lines;

a second array of conducting lines crossing the first array of conducting lines; and wherein a photo-detecting element in the matrix of photo-detecting elements is electrically connected between a conducting line in the first array of conducting lines and a conducting line in the second array of conducting lines.

20. The television of claim 19, wherein a photo-detecting element comprises:

a photodetector having a first terminal electrically connected to a conducting line in the first array of conducting lines and having a second terminal electrically connected to a conducting line in the second array of conducting lines.

21. The television of claim 19, wherein a photo-detecting element comprises:

a switching transistor having a gate electrically connected to a conducting line in the first array of conducting lines; and a photodetector having a first terminal electrically connected to a conducting line in the second array of conducting lines though a semiconductor channel of the switching transistor.

22. The television of claim 19, further comprising:

a matrix of pixel elements wherein a pixel element having a terminal electrically connected to a conducting line in the first array of conducting lines.

23. A display device comprising:

a matrix of pixel elements;

a display screen;

a first array of conducting lines;

a second array of conducting lines crossing the first array of conducting lines;

a matrix of photo-detecting elements constructed on a first substrate wherein a photo-detecting element is electrically connected between a first conducting line in the first array of conducting lines and a second conducting line in the second array of conducting lines, wherein the matrix of pixel elements is constructed on the first substrate; and an interface port accessible from the outside of the display device and configured to output a representation of a position of an invisible light spot on the display screen generated from an invisible light beam projected thereon with a spreading angle less than 20 degrees, wherein the position of the invisible light spot is determined based on measurement from the photodetectors in the matrix of photo-detecting elements.

24. The display device of claim 23, wherein the photo-detecting element comprises:
a photodetector having a first terminal directly connected to the first conducting line and having a second terminal directly connected to the second conducting line.

25. The display device of claim 23, wherein a photo-detecting element comprises:
a photodetector;
a switching transistor having a gate electrically connected to the first conducting line and having a semiconductor channel; and
wherein the photodetector and the semiconductor channel of the switching transistor are serially connected to the second conducting line.

* * * * *